United States Patent Office 3,122,784
Patented Mar. 3, 1964

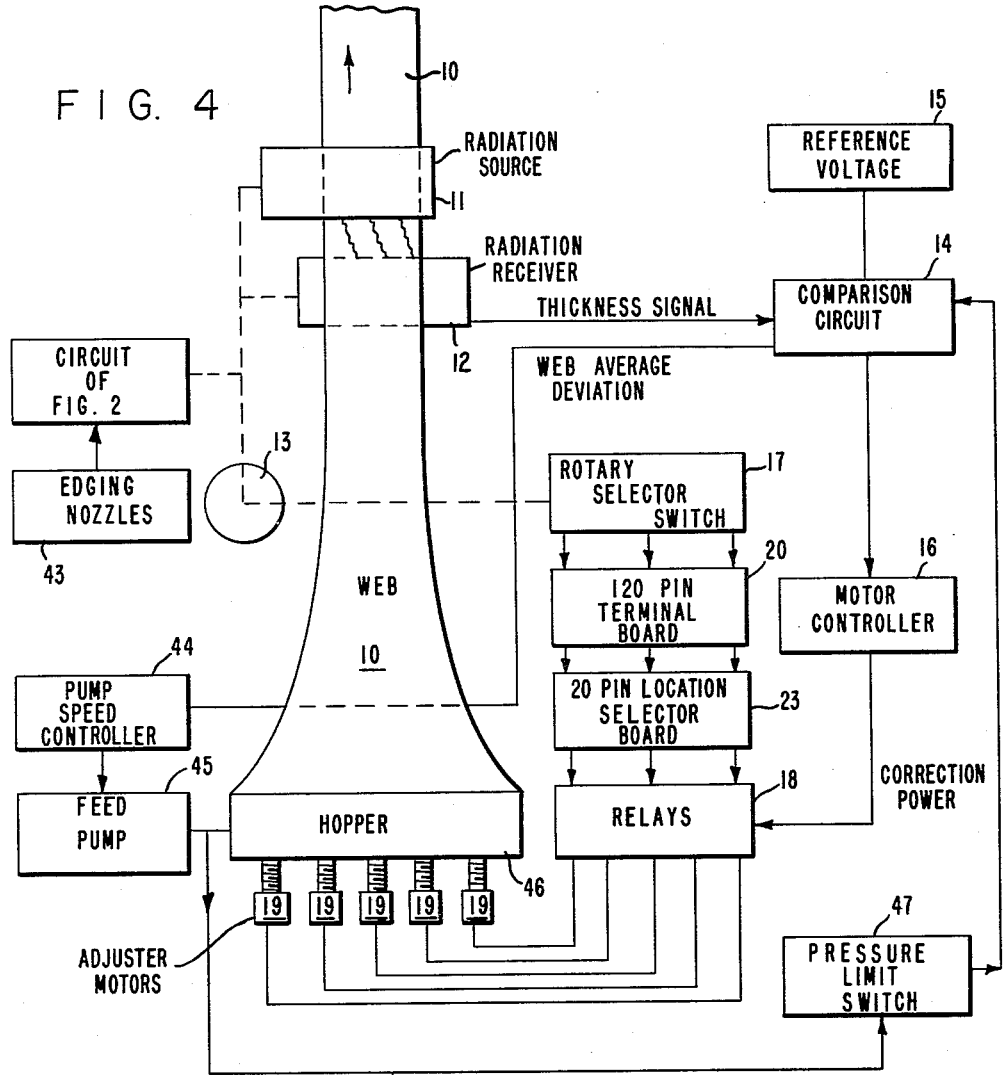

3,122,784
GAUGE CONTROL APPARATUS FOR
MANUFACTURING WEB MATERIAL
Charles Nelson Jolliffe, Circleville, Ohio, assignor to E. I.
du Pont de Nemours and Company, Wilmington, Del.,
a corporation of Delaware
Filed June 26, 1961, Ser. No. 119,693
1 Claim. (Cl. 18—2)

This invention relates to an automatic gauge control system useful in the manufacture and processing of web materials. More particularly, it relates to a control system that is useful in manufacturing web materials that have a variable relationship between the extruded dimensions and the finished dimensions.

As is known, the production of plastic film involves the use of a hopper adapted to contain the plastic as a viscous liquid (usually in the molten state) along with extrusion means in the form of orifice-defining lips integral with the hopper. A pump is employed to force the plastic through the lips of the hopper to form the film. The pressure on the material is due to the action of the pump as well as the size of the opening defined by the lips. In the production of extruded film with such apparatus, variations in thickness across the width of the film are not uncommon. These may be due to uneven wear of the lips of the extruder or deficiencies in other mechanical parts of the extruder or to variations in the amount of the extruded material fed to the lips at any particular point across the width. In the manufacture of plastic films such as cellophane, oriented polyester films such as Mylar[1] polyester film, and stretched polyolefin films (polyethylene film, polypropylene film, etc.), these thickness variations due to machine problems are further complicated by changes in the width of the material from the point of extrusion to the point of winding up the finished material. Cellophane tends to shrink as it changes its chemical constitution during processing. Stretching of the other films in the longitudinal or transverse direction to improve physical properties tends to change the width of the films. This shrinkage, in the case of cellophane, and width alteration, in the case of the other films, usually does not occur uniformly across the width of the web. Hence, the position of a deviation in the thickness of the material at the windup end does not necessarily correspond directly to that position at the extruder portion of the machine. Experience, however, may teach the operator the location on the extruder at which an adjustment should be applied to correct a specific deviation band observed at the windup end.

Manually controlled systems have been used to adjust these deviations. However, such systems require constant personal attention and are necessarily expensive to operate. Manufacturers in this field have attempted to adopt automatic thickness control systems. These systems involve a direct response between the thickness-sensing element and the windup end of the machine and the operation of an adjusting element at the extruder. These systems make no allowance for the non-uniform change in width of the material. These systems do not take into account the nature of the specific material being processed that may dictate the place on the extruder that the adjustment must be applied to correct a specific deviation band at the windup end of the machine.

In applications Serial Nos. 119,499 and 119,500, both filed June 26, 1961 and assigned to the assignee of the present application, automatic gauge control systems are provided that can be preset and adjusted if desired to compensate for the width narrowing or widening of a moving web and to compensate for any other variations that may be peculiar to the particular material being manufactured. The object of this invention is to prevent such automatic gauge control systems from being inaccurate due to sway or other sidewise movement of the moving web. Other objects will appear hereinafter.

The objects are accomplished by employing in the automatic gauge control system composed of means for transversely scanning the web, the scanning means adapted to move in two directions and to determine the deviation of the web thickness from a reference standard at a particular location on the web; means responsive to the deviation determination adapted to adjust the thickness of the web, said adjustment means disposed at the web-forming position and at a plurality of locations across the width of the web; and means interposed between the scanning or thickness-sensing means and the adjustment means, the interposed means adapted to vary the location on the adjustment means at which the adjustment means reacts to the output of the scanning means at any particular location of its transverse scan, the improvement wherein each of two potentiometers are adapted to control the movement of said scanning means in each of the two directions; and width-sensing means are mechanically coupled to said potentiometers adapted to signal said potentiometers to change direction of movement of said scanning means.

Specifically, the interposed means may be composed of two interconnected multiple-juncture terminal boards, the first terminal board communicating with the thickness-sensing device and the second terminal board communicating with the adjustment means, the number of junctures on the first terminal board being substantially greater than the number of junctures on the second terminal board whereby the deviations at several sensing points can be transmitted to a single adjustment point as in Serial No. 119,499.

Alternatively, variable resistor means may be interposed between the scanning or thickness-sensing means and the adjustment means, the resistor means adapted to vary the location on the adjustment means at which the adjustment means reacts to the output of the scanning means at any particular location of its transverse scan as in Serial No. 119,500.

The improvement of this invention will be discussed with respect to the first-mentioned system and will be more clearly understood by referring to the following drawing wherein:

FIGURE 4 is a block diagram showing the coaction among the extruder, the extruded sheet, the sensing means and the adjustment means.

Figure 1:
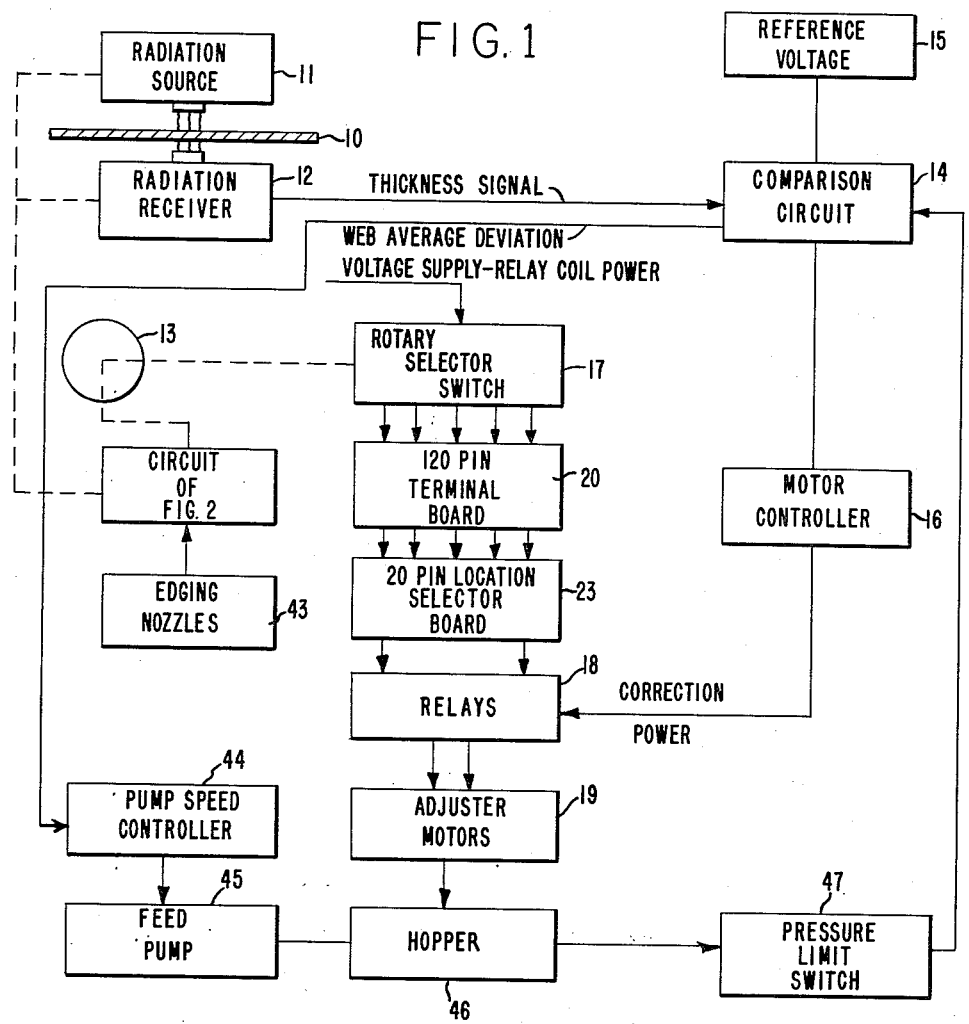
FIGURE 1 is a block diagram illustrating the functional relationship of the basic equipment for carrying out the invention.

Referring to FIGURE 1, a radiation source 11 and receiver 12 are caused to scan back and forth across the moving web 10 by motor 13. Receiver 12 has an output which varies with the thickness of web 10. The radiation source and receiver may be any of several forms known to the art for determination of the thickness of objects by attenuation or absorption of radiation. For example, beta-rays from a radioactive source, X-rays, or optical radiation such as ultraviolet, visible or infrared light, may be employed as the radiation source. The signal from the radiation receiver, which varies according to the thickness of the web, is compared in circuit 14 with an adjustable reference standard voltage from source 15. This comparison produces a signal which varies as the deviation of the thickness of the web from the pre-

[1] Registered trademark of E. I. du Pont de Nemours and Company.

selected standard. The magnitude of the deviation is preferably sensed by a slide wire device coupled to a display device, such as a strip-chart recorder (not shown).

An electronic motor speed controller 16 (such as a "Thymotrol" speed controller, manufactured by the General Electric Company) receives the deviation signal and provides power to control the direction and speed of the adjuster motors according to the sign and magnitude of the thickness deviation. The selection of the appropriate adjuster motor is accomplished through a circuit controlled by the motor 13. A separate motor, not shown, drives the traversing thickness-sensing element 11 and 12. The drive motor 13 is mechanically coupled to the movable or rotatable contact of a multiple-pole rotary switch 17. Rotatable is used to define the arm which oscillates through a circular arc. As the thickness-sensing element 11 and 12 traverses back and forth across the web, the rotary arm oscillates through a predetermined arc on rotary switch 17. The rotary arm is electrically coupled to a source of power to energize the appropriate one of relays 18 which are individually coupled to the adjuster motors 19. Rotation of the rotary contact arm of rotary switch 17 through an arc causes sequential distribution of energy to a plurality of separate channels (120 in the preferred case) according to the instantaneous position of the thickness-sensing element with respect to the width of the web.

Figure 3:
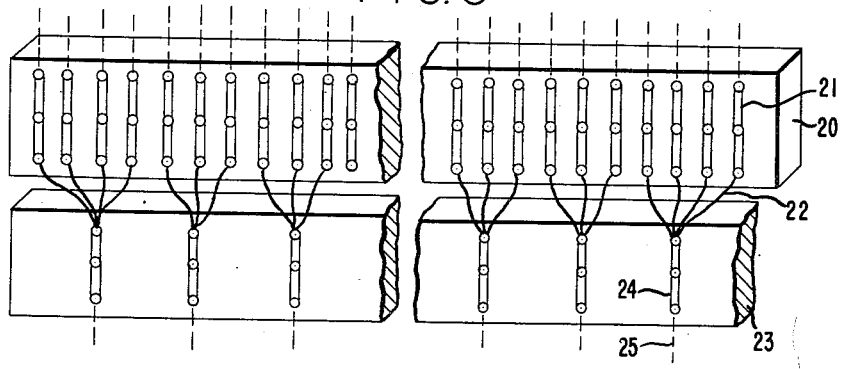
FIGURE 3 is a view partly schematic of the pinboard circuit distribution element.

The energy is transmitted in a multiple-conductor cable to a multiple-juncture terminal board 20 as shown partly in schematic view in FIGURE 3. Each conductor of the cable terminates in a juncture 21 which has a jack for receiving a removable jumper wire 22. The jumper wires terminate at junctures of a similar terminal board, 23 of FIGURE 3, having a smaller number of junctures 24. These junctures are further coupled by cable 25 to the adjuster-motor relays 18. By means of the terminal boards and the jumper wires the motor controlling relays can be actuated according to a program preselected on the basis of the shrinkage or the stretching pattern of the web. The combination of the rotary switch and the terminal boards control the selection and actuation of the relays, and the control signal from the electronic speed controller determines the direction and speed of operation of the adjuster motors.

The rotary switch, pinboard combination is equipped with relay switching devices so arranged that as the thickness-sensing device traverses toward the edge of the web all of the motor control relays 18 are actuated, but upon the return of the scan, the relays are inactive until the scan reaches about one-third the distance across the web. The operation is repeated at each end of the traverse. This is required to prevent doubling the correction, since the corrective action would not have been effective upon immediate reversal of the scan. The use of this arrangement, and the number of motors rendered inoperative is optional, dependent on the relative rate of web travel and the rate of scan, which determines the time lag between sensing and correction.

Figure 2:
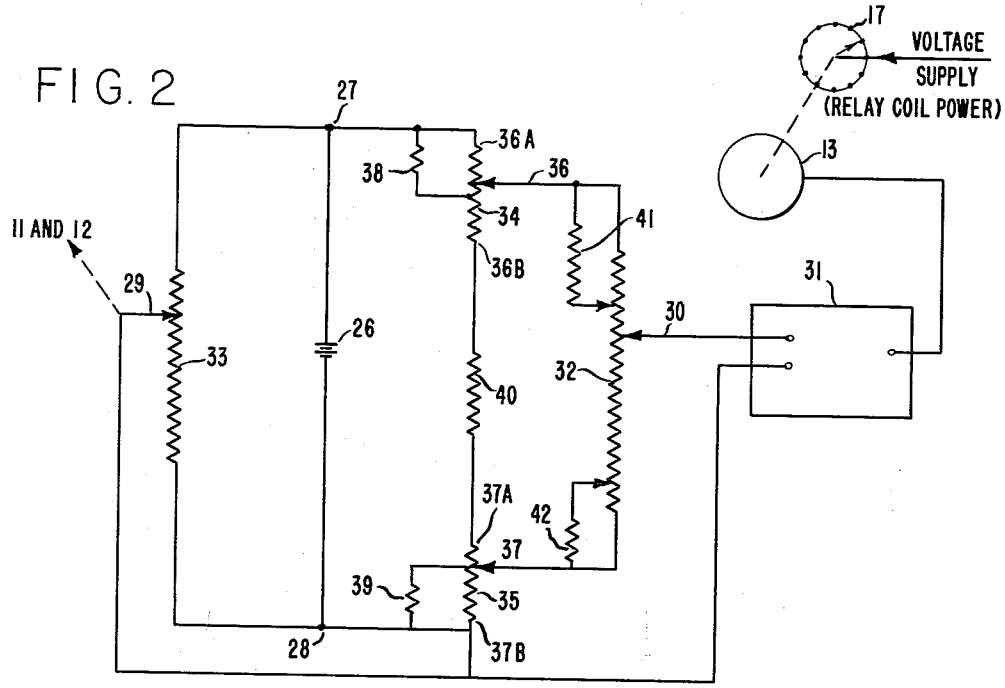
FIGURE 2 is a partial circuit diagram of the means for controlling edge effects in accordance with this invention.

The resistance circuit shown in FIGURE 2 is coupled to an edge-sensing mechanism to permit the scanning device 11 and 12 to reach the edges of the web simultaneously with the rotation of selector switch 17 reaching the end of its arc in the event of sway or irregular shrinkage of the web. This resistance circuit is supplied with a voltage from source 26, illustrated as a battery, between points 27 and 28, and connected to the input terminals of an amplifier 31 at points 29 and 30. The amplifier input drives motor 13 which is mechanically coupled to potentiometer 32 in such a way that the motor 13 adjusts potentiometer 32 in the direction required to bring the point 30 to the same voltage as point 29. The same motor is also coupled to the rotating selector switch which determines the time of operation of adjuster motors. The potentiometer 33 is mechanically coupled to the thickness-sensing, scanning source and receiver 11 and 12, the combination called the gauge, so that the position of point 29 (and therefore the voltage of point 29) is a function of the gauge position. Point 29 moves from the voltage of 27 to that of 28 as the gauge moves from its home position to the opposite end of the scan, and returns to 27 as the gauge returns to its home position. While this is occurring, the amplifier and motor rotate potentiometer 32 to keep point 30 at the same voltage as 29, except when contact 29 is at a potential above point 37 or below point 36. When the voltage at point 29 reaches the voltage of point 37 or point 36, the potentiometer 32 will be at one end of its travel. The result is rotation of the selector switch 17 through a predetermined arc as the traversing mechanism scans between two points determined by the voltages at 37 and 36.

Potentiometers 34 and 35 serve as the means for maintaining the traversing mechanism over the web at all times. The voltages at 36 and 37 are determined by the settings along potentiometers 34 and 35, respectively. Potentiometers 34 and 35 are mechanically coupled (in an appropriate manner, not shown) to the edging nozzles 43 of a width-sensing device. Hence, the voltages at 36 and 37 are determined by the positions of the web edges. Point 36 is varied through its range (36A to 36B) as the sheet varies from its outer limit to its inner limit. The rotation of the selector switch reaches one end of its arc as point 29 reaches the voltage of point 36. Values in the circuit are selected so that this occurs as the gauge reaches the edge of the sheet. Similarly, point 37 controls the rotation of the selector of the rotary switch in the opposite direction. Resistors 38 and 39 are included to improve linearity of the relation between web edge locations and the voltages at 36 and 37, respectively. Limiting resistor 40 serves to limit the current, and correspondingly, the voltage between points 36 and 37. Resistors 41 and 42 which are optional make the voltage distribution across 32 non-uniform with less voltage change per degree of rotation near the extremes of the travel of potentiometer contact 30. This requires the motor speed to increase in order to keep the circuit balanced. Power to actuate the relays is transmitted to the rotary contact arm of rotary switch 17, and thence by multiple-conductor cable to the pinboard 20. From this point onward, operation of the control system is identical to that of the embodiment previously described.

In FIGURE 1, elements to eliminate other deficiencies inherent in the system or created by the system are also provided. These include the unit weight control system to reduce long-range drift in the average gauge of the web, and a hopper pressure control to assure uniform extrusion pressure as the lips are opened and closed in response to correction signals.

The unit weight control system comprises an electric drive motor 44 geared to the speed control of a positive-displacement continuously variable pump 45 which supplies the extrusion hopper 46. The control motor on this pump is actuated by the thickness deviation signal selected at several points distributed across the web. These signals are connected in parallel so that the net signal to the pump control for each traverse of the thickness-sensing element represents the average deviation across the web. The control is so coupled that it changes speed of the positive-displacement pump in the direction required to bring the average thickness back to the standard and nullify the deviation signal.

The hopper pressure control device comprises a pressure-operated electric switch 47 which can be set to produce a signal if the pressure goes beyond certain arbitrary limits. A pressure higher than the selected limit produces a signal which is transmitted to the hopper motor relay in the voltage comparison circuit 14 which controls the closing motion of the lips of the hopper and cancels said signal by opening the circuit. A pressure which is lower than the limit would similarly render the lip-opening relay inactive.

Another possibility for the pressure control element incorporates control of the standardization bias, or reference voltage in the voltage comparison circuit 14 instead of cancelling the control signals, as described. In this case, a signal from the hopper pressure-gauge indicating a pressure above the selected limit causes an increase in the bias voltage such that the entire transverse thickness is increased, resulting in a general opening of all lips by an equivalent value, but without cancelling individual control signals.

Having fully disclosed the invention, what is claimed is:

In an apparatus for extruding a web of material composed of a hopper adapted to contain said material for said web; extrusion means composed of orifice-defining lips disposed in integral relationship with said hopper adapted to extrude said material in the form of a web; a pump adapted to force said material through said lips of said extrusion means; windup means disposed distant from said extrusion means adapted to collect said web; means for transversely scanning the moving web, the scanning means disposed between said extrusion means and said windup means adapted to move in two directions and to provide an output that is directly related to the deviation of the web thickness from a reference standard at any particular location across the width of the web; adjustment means responsive to said output adapted to adjust the thickness of said web, said adjustment means disposed at said extrusion position and at a plurality of locations across the width of said web; means interposed between said scanning means and said adjustment means, adapted to vary the location on the adjustment means for reaction of said adjustment means to the output at any particular location on said scanning means; the improvement wherein two potentiometers are provided, each potentiometer adapted to control the movement of said scanning means in each of the two directions; and width-sensing means, mechanically coupled to said potentiometers, adapted to signal said potentiometers to change direction of movement of said scanning means.

References Cited in the file of this patent

UNITED STATES PATENTS

| | | |
|---|---|---|
| 2,051,781 | Brown | Aug. 18, 1936 |
| 2,387,718 | Coleman | Oct. 30, 1945 |
| 2,566,854 | Rhodes | Sept. 4, 1951 |
| 2,800,590 | Gilman | July 23, 1957 |
| 2,923,971 | Nelson | Feb. 9, 1960 |
| 3,006,225 | Mamas | Oct. 31, 1961 |
| 3,015,129 | Hays et al. | Jan. 2, 1962 |

FOREIGN PATENTS

| | | |
|---|---|---|
| 1,047,276 | Germany | Dec. 24, 1958 |